Sept. 10, 1968      A. G. MULLER      3,400,744
CLEATED PNEUMATIC TIRE
Filed Oct. 23, 1965
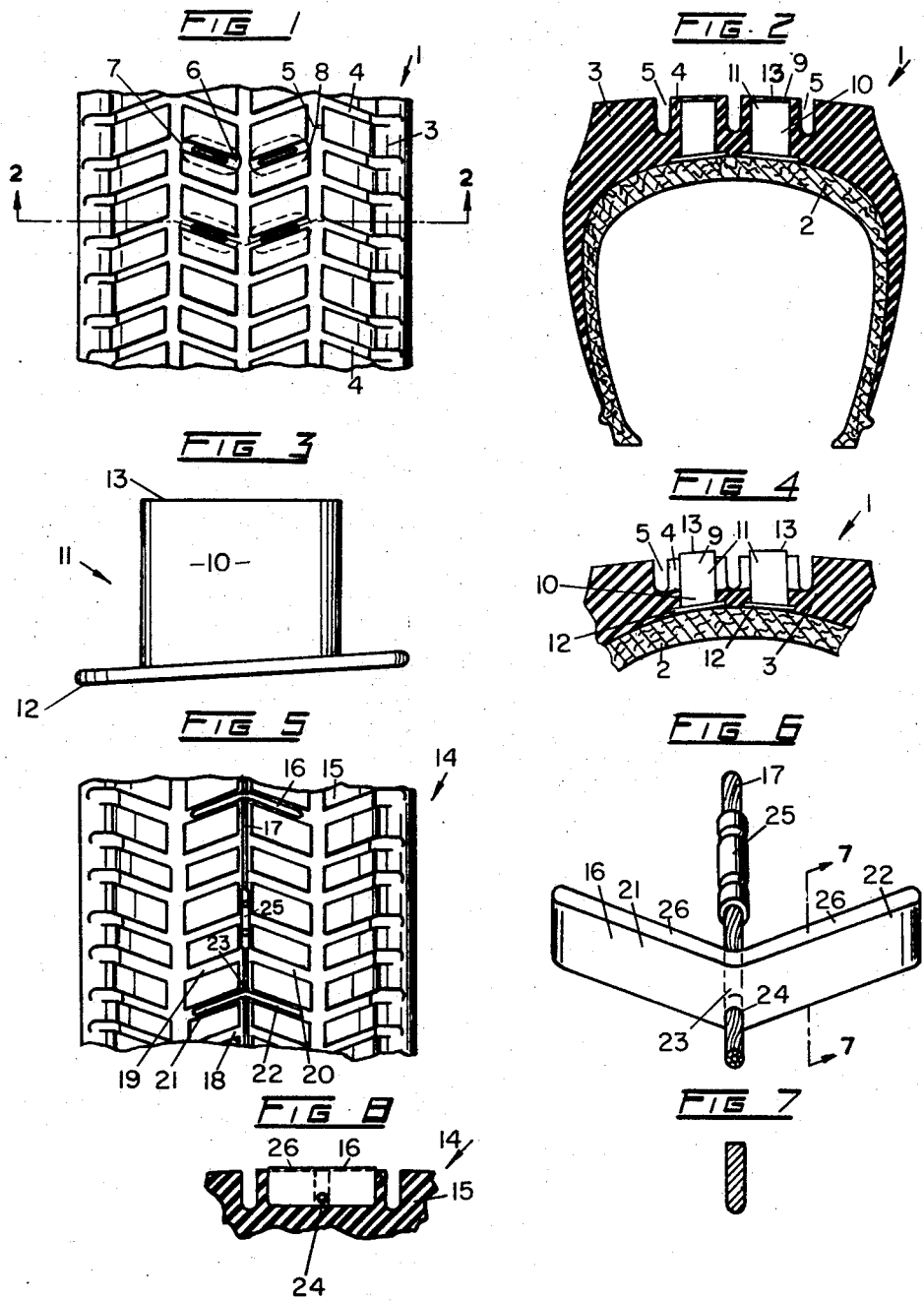
INVENTOR
ARNO GERHARD MULLER
ATTORNEYS

United States Patent Office 3,400,744
Patented Sept. 10, 1968

3,400,744
CLEATED PNEUMATIC TIRE
Arno Gerhard Muller, 1250 W. 102nd Place,
Denver, Colo. 80221
Filed Oct. 23, 1965, Ser. No. 503,900
3 Claims. (Cl. 152—208)

ABSTRACT OF THE DISCLOSURE

The present invention involves non-skid cleat assemblies for use with vehicular tires which may be either inherent in the tire or a separate unit capable of being removed whenever desired. The cleat assembly is designed to be retracted within the vehicular tire during non-use thereof merely by reducing the pressure of said tire; however, when the cleat assembly is to be used, the tire pressure is raised slightly thereby forcing the cleats to protrude from said tire, thus enabling the said cleats to grip the roadway in a non-skid manner.

---

It is well known in the art to fit metal cleats or studs to tires in order to improve traction on slippery surfaces such as ice and snow covered roads. Tire studs of prior assemblies have the disadvantage that when new they permanently protrude from the tread of the tire so that when used on bare pavement they break up the surface, and when they become worn they no longer provide any advantage in traction. Tire chains are also utilized to provide traction in slippery weather conditions, but these are bulky, awkward to fit and liable to fracture, usually damaging the vehicle.

A primary object of the instant invention is, therefore, to provide a tire equipped with cleats, which will greatly improve traction when required but which may also be retracted or removed when not required.

Another object is to provide tire cleats which in one embodiment of the invention are so positively secured within the tire that they cannot work loose, and in a second embodiment are securely maintained in position by cable means.

A further object of my invention is to provide a tire wherein the cleats may be fitted or removed at will, and in which any required number of cleats may be fitted.

Still another object of both embodiments of the invention is to provide tire cleats which present the greatest possible edge length to the road surface at an angle which ensures maximum traction efficiency.

In drawings which illustrate the various embodiments of the invention:

FIGURE 1 is a fractional plan view of a tire to which cleats embodying the features of the instant invention are fitted, FIGURE 2 is a sectional side elevation of the tire of FIGURE 1, taken on the line 2—2, showing the tire at low pressure with the cleats retracted, FIGURE 3 is a perspective view of one of the cleats of FIGURE 1, FIGURE 4 is a fractional side elevation of the tire similar to that of FIGURE 2, showing the tire at high pressure with the ends of the cleats extended, FIGURE 5 is a fractional plan view of a tire to which cleats of a modified embodiment of my invention are fitted, FIGURE 6 is a perspective view of one of the cleats of FIGURE 5, showing also the retaining cable and its end fitting, FIGURE 7 is a sectional end elevation of the cleat of FIGURE 6, taken on the line 7—7, and FIGURE 8 is a fractional sectional side elevation of the tire of FIGURE 5, showing one of the cleats in position in the tire tread.

Like numerals of reference indicate corresponding parts in the various figures.

Referring to FIGURES 1, 2 and 3, a tire 1 is of substantially conventional design and includes an inner lining 2 of fabricized material and a deep, resilient tread 3. The tread 3 is of a preferred snow-tire design and includes a plurality of parallel, zig-zag, transverse slots 4 and a further plurality of parallel circumferential slots 5, and in the preferred configuration as illustrated, the slots 4 are equally disposed about a center line to provide central V-slots, as shown at 6.

Each arm 7 and 8 of selected V-slots 6 is adapted to house the outermost portion 9 of the radially extending wall 10 of a cleat 11. The wall 10 extends upwardly from the center line of a base plate 12 and depending on the tire design, the wall 10 and base plate 12 may be at right angles to each other in all planes or, as in this instance, may be in oblique relationship in the transverse plane.

From FIGURE 2, it will be noted that this obliquity is embodied to permit the base plate 12 to remain substantially parallel with the inner lining 2 which is arcuate in section while insuring that the wall 10 extends radially outwardly and the outer edge 13 is parallel with the flat center portion of the tread 3.

From FIGURE 2 it will be noted that when inflation pressure is low, the edge 13 of the cleat 11 is adapted to lie below the surface of the tread 3 and in this manner the vehicle having tires 1 mounted upon it is able to run on asphalt pavement and the like without damaging the road surface.

However, upon the cleats 11 being required to provide additional traction, the tire pressure is increased and, as shown in FIGURE 4, the change in profiles of the inner lining 2 and tread 3 results in the cleats 11 being caused to protrude from the tread 3 for a distance sufficient to enable the outer edges 13 to dig in and grip the road surface with maximum efficiency.

It should also be noted that in this preferred embodiment the cleats 11 are arranged in pairs in V formation to provide the maximum length of time in contact with the road surface in combination with maximum thrust angle.

Partial deflation of the tire results in a change of profile and retraction of the cleats into the tread.

FIGURES 5, 6, 7 and 8 illustrate an alternative embodiment of my invention in which a tire 14 of similar design to the tire 1 of FIGURE 1 and having a tread 15 substantially the same pattern as tread 3 of FIGURE 1 carries a plurality of cleats 16 on a cable 17.

A feature of the tread 15 is the central circumferential groove 18 and the plurality of slots 19 and 20 running outwardly and rearwardly therefrom in V formation as part of the zig-zag tread arrangement.

Each cleat 16 is formed from elongated rectangular, flat plate material bent about the center line to form two wings 21 and 22 in V-formation, adapted to fit closely within the slots 19 and 20 respectively in the tread 15, and the center portion 23 is adapted to lie in the central groove 18. A hole 24 is formed through the center portion 23 of each cleat 16 to allow the cable 17 to pass freely therethrough and so connect the cleats 16.

In the use of the structure of FIGURES 5, 6, 7 and 8 a plurality of cleats 16 are strung on the cable 17 and are then inserted in the tread 15 in spaced apart relation, and in the interests of wheel balance it is advised that they should be equi-spaced around the periphery of the tire. The wings 21 and 22 fit within their respective slots 19 and 20 and the cable 17 which lies within the circumferential groove 18 is then tightened and its ends secured by a collar 25.

It should be noted that in this arrangement the outer edges 26 of the cleats 16 protrude beyond the profile of the tread 15 at all times, but when extra traction is no longer required, the cleats may be removed by opening the collar 25 and releasing the ends of the cable 17. Furthermore, should it be desired to increase or decrease the number of cleats on the tire, then it is simply a matter of freeing the ends of the cable from the collar 25; adding or subtracting the required number of cleats and refitting the assembly to the tire.

The collar 25 in the drawing is shown as a swaged, tubular type but it should be understood that I do not wish to limit the scope of my invention to this type alone, other types such as turnbuckles and the like being equally effective.

From the foregoing, the construction and operation of the invention will be readily understood and further explanation is believed to be unnecessary. However, since modifications and changes may readily occur to those skilled in the art, it is not desired to limit the invention to the exact construction shown and described, and accordingly all suitable modifications and equivalents may be resorted to, falling within the scope of the appended claims.

What I claim is:

1. A cleat assembly for use in a tire having a grooved tread comprising: a plurality of cleats housed in said grooved tread in spaced-apart relation, each of said cleats including a flat plate of elongated rectangular form bent about the center line to form a pair of wings in V-formation, said wings being closely insertable in said grooved tread with said center line of said cleats adapted to be positioned in a central circumferential manner within said grooved tread, each of said flat plates being perforated at said center line; cable means threadable through each of said flat plates; and, means joining the ends of said cable to maintain said flat plate in position in said tread.

2. In a tire having a grooved tread with a central peripheral groove and a plurality of pairs of said grooves, each of said pairs of grooves being in a V-formation about said central groove, the improved cleat assembly comprising: a plurality of cleats adapted to fit closely in said grooved tread in spaced-apart relation, each of said cleats including a flat plate of elongated rectangular form bent about a center line to form a pair of wings in V-formation, said wings being insertable in said pairs of grooves with said center line corresponding with said central groove, each of said flat plates being perforated at said center line; cable means threadable through each of said flat plates; and, means joining the ends of said cable to maintain said flat plate in position in said tread.

3. A tire and cleat assembly; said tire having a grooved tread formed on the periphery thereof; a plurality of cleats housed in said grooved tread in spaced apart relation; each of said cleats comprising a flat plate having an outer edge; all of said outer edges of said cleats standing proud of the outer surfaces of said tread in an operative position; said outer edges being removed from the outer surface of said tread in an inoperative position; and means retaining said cleats in said tread; said grooved tread having a central peripheral groove and a plurality of pairs of side grooves; each of said pairs of grooves being in V-formation about said central groove; said flat plate being of elongated rectangular form bent about the shorter center-line to form a pair of wings in V-formation; said wings being closely insertable in said pairs of grooves with said center-line corresponding with said central groove; each of said flat plates being perforated at said center-line; cable means threadable through each of said flat plates; and means joining the ends of said cable to maintain said flat plate in position in said tread.

References Cited

UNITED STATES PATENTS

| | | | |
|---|---|---|---|
| 2,480,548 | 8/1949 | Carhart | 152—208 |
| 3,095,918 | 7/1963 | Mike | 152—208 |

FOREIGN PATENTS

| | | |
|---|---|---|
| 469,658 | 7/1937 | Great Britain. |

ARTHUR L. LA POINT, *Primary Examiner.*